United States Patent [19]

Pischzik et al.

[11] 4,304,387
[45] Dec. 8, 1981

[54] SUSPENSION OF PIPES OR TUBES

[75] Inventors: Bruno Pischzik, Ratingen; Johann Schneiderat, Xanten, both of Fed. Rep. of Germany

[73] Assignee: Mannesmann Aktiengesellschaft, Düsseldorf, Fed. Rep. of Germany

[21] Appl. No.: 122,576

[22] Filed: Feb. 19, 1980

[30] Foreign Application Priority Data

Feb. 16, 1979 [DE] Fed. Rep. of Germany ....... 2906547

[51] Int. Cl.³ ................................................. F16L 3/00
[52] U.S. Cl. ........................................ 248/571; 248/59
[58] Field of Search ...................... 248/571, 58, 59, 60

[56] References Cited

U.S. PATENT DOCUMENTS

| | | | |
|---|---|---|---|
| 2,480,864 | 9/1949 | Loepsinger | 248/571 |
| 3,534,934 | 10/1970 | McCabe | 248/571 |
| 3,539,136 | 11/1970 | Suozzo | 248/59 |
| 3,718,305 | 2/1973 | Suozzo | 248/58 |
| 4,206,898 | 1/1980 | Salter | 248/571 |

Primary Examiner—Francis K. Zugel
Attorney, Agent, or Firm—Smyth, Pavitt, Siegemund & Martella

[57] ABSTRACT

A tube or pipe for the conduction of hot fluid is suspended in the vertical by means of an anchor, pivotally linked to the long arm of a two-arm lever which is pivoted on the tube or pipe and has its second, short arm linked to a pivot-near point of a one-arm lever, and is in line with a rod extending between this one-arm lever at right angles thereto and axially along the pipe or tube to a remote connection point on the tube. The long-arm portion of the one-arm lever is spring-biased; the compression of the spring varies with vertical displacement of the tube or pipe, but the two-arm lever is pivoted by exactly the same amount when the tube is displaced and when, upon expansion, the one-arm lever is pivoted, which pivot motion is transmitted upon the two-arm lever.

4 Claims, 6 Drawing Figures

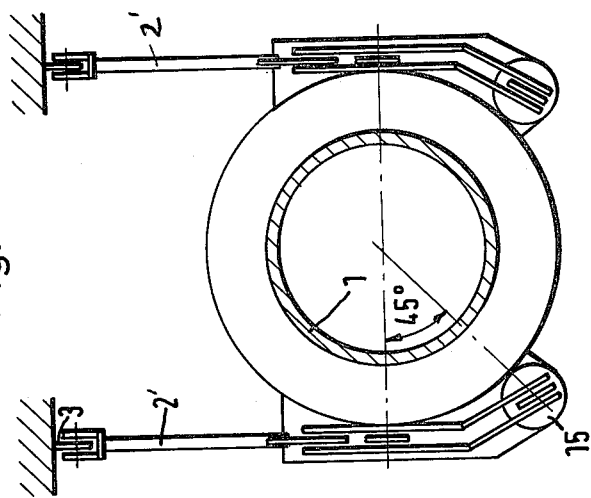
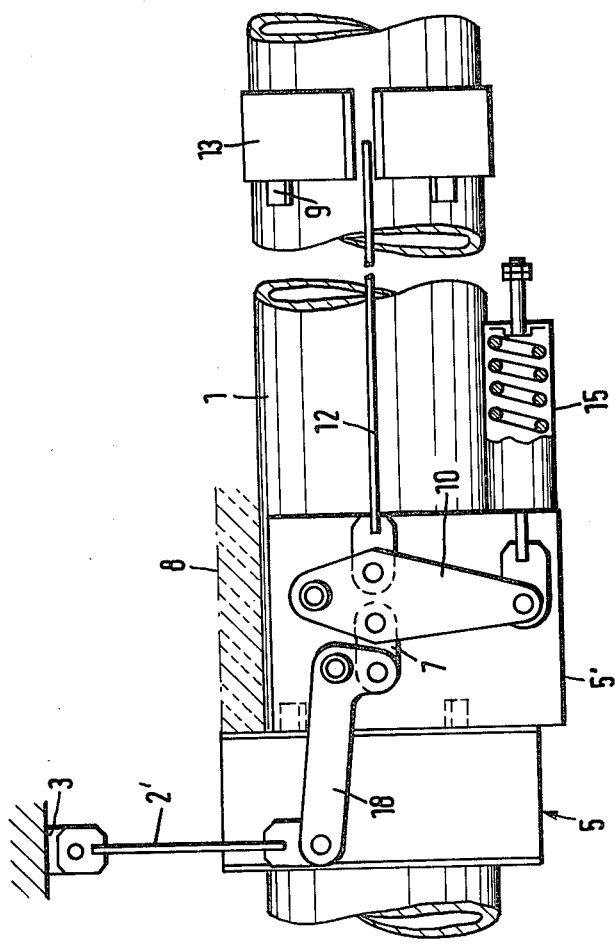

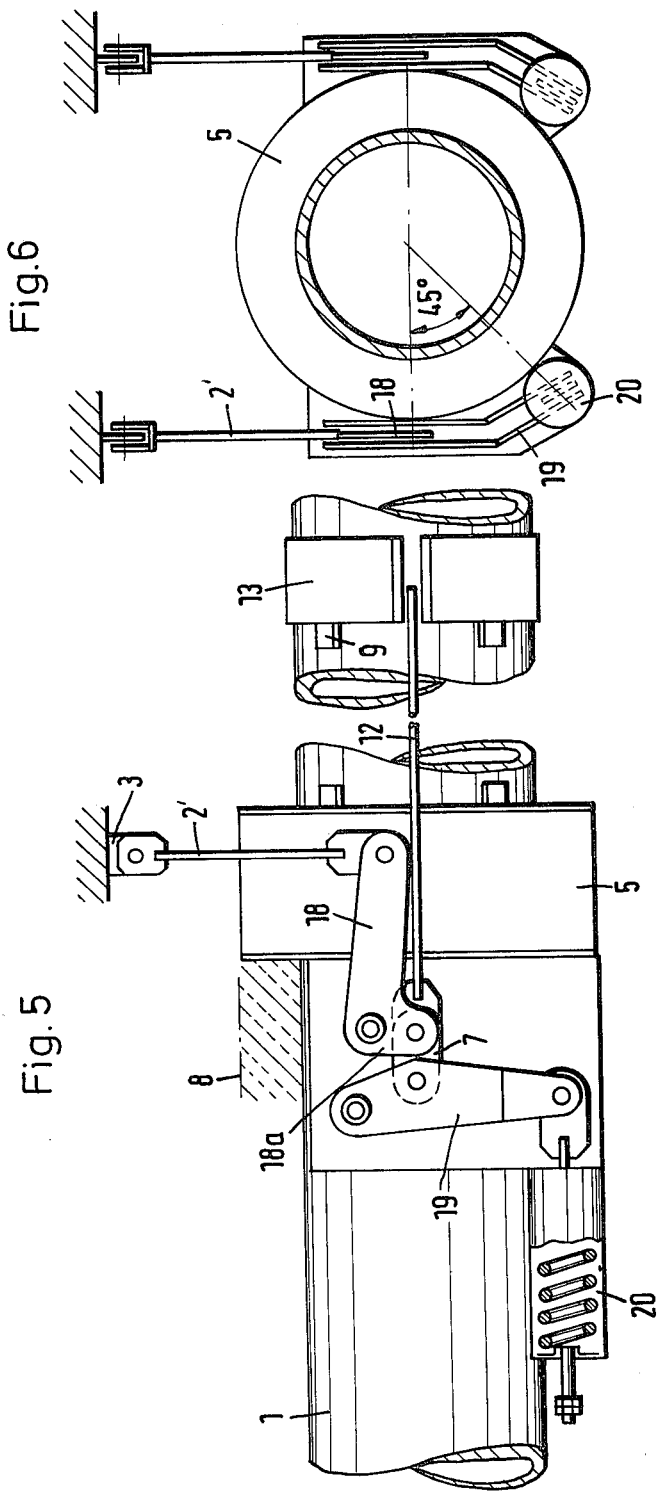

SUSPENSION OF PIPES OR TUBES

BACKGROUND OF THE INVENTION

The present invention relates to a device for suspending and supporting hot tubing, pipes, or the like.

In our copending application, Ser. No. 950,086, filed on Oct. 10, 1978, we have suggested a device for suspending a tube from a stationary frame, or the like. The device is designed to take care of the problem, arising when the tube expands with increasing temperature. Specifically, the device compensates for the resulting displacement of the tube's suspension point vis-a-vis a fixed suspension point at the frame while ensuring a constant suspension force. The device includes an anchoring structure, defining a stationary anchor point on the frame, building wall, etc., as well as a connection point at a fixed vertical distance from the anchor point. A two-arm lever has its longer arm and end point linked to the connect point, and a rod is pivoted at one end, e.g., to the short end of the two-arm lever. The rod extends alongside the tube, is spaced therefrom for thermal isolation, and its other end is pivoted to the tube. The pivot point of the two-arm lever is also privoted to the tube, that pivot point being spaced from the rod pivot on the tube. A spring, or spring means, is interposed between support points on the rod and the tube in order to take up at least part of the suspension force. This device is not of the so-called constant support variety, but is of the controlled variety, using but the thermal expansion itself for compensating any suspension displacement. Supplemental control power is not required. The principle behind this earlier device is to geometrically fix the connect point (at the two-arm lever) in a dynamic fashion to take up thermally induced displacements of any point that is connected to the tube. Two reference points on the tube are established, one being the point of connection to the two-arm lever, the other one being the one-end connection of the rod. These spaced-apart reference points move apart in relation to each other when the tube expands, and that displacement is transmitted upon the rigid rod which, in turn, pivots the two-arm lever to, thereby, move the connect point of the latter to the frame anchor. This resulting displacement is oppositely equal to the vertical displacement of the tube as a whole due to thermal expansion so that the location of the connect point between anchor and two-arm lever remains invariant, ensuring constant suspension and support force. The interposed spring provides load relief for reacting some of the forces on the rod into the tube. Further for the state of the art, reference is made to German patent application No. 19,59,878 (See also U.S. Pat. No. 3,539,136).

DESCRIPTION OF THE INVENTION

It is an object of the present invention to provide a new and improved controlled suspension for thermally expanding and displaced tubing.

It is a specific object of the present invention to improve controlled and temperature-compensated suspension and support for a heated tube or pipe, in which a two-arm lever, pivoted on the tube, has its long arm connected to a suspension; the connect point is to remain invariant. Also, a load relief spring is to be used in cooperation with a tension rod.

In accordance with the preferred embodiment of the present invention, the suspension and support device, as per the specific object, is improved by connecting the short arm of the two-arm lever to a pivot-near point of a one arm lever whose long arm end acts on (and is acted upon ) by a spring, bearing otherwise against the tube or pipe. The tension rod is interposed between the one-arm lever and a point on the tube or pipe remote from the pivots of the levers. Thus, the force on the short arm of the two-arm lever is divided by that lever between rod tensioning and spring compression. The spring compression varies for different dynamic conditions on account of temperature variations.

DESCRIPTION OF THE DRAWINGS

While the specification concludes with claims, particularly pointing out and distinctly claiming the subject matter which is regarded as the invention, it is believed that the invention, the objects and features of the invention, and further objects, features, and advantages thereof, will be better understood from the following description taken in connection with the accompanying drawings, in which

FIG. 3 is a side elevation of a suspension device of the preferred embodiment illustrating the best mode of practicing the invention for the suspension of a horizontally running tube, assumed to be upwardly displaced upon heating.

FIG. 4 is a side and section view as per line IV—IV in FIG. 3;

FIG. 5 is a side elevation of a suspension device of the preferred embodiment, illustrating the best mode of practicing the invention for the suspension of a horizontally running tube assumed to be downwardly displaced upon heating; and FIG. 6 is a side and section view taken along lines VI—VI in FIG. 5.

Proceeding now to the detailed description of the drawings, FIG. 1 illustrates a vertically extending portion of a high temperature steam pipe or tube 1. This tube portion is suspended and supported by means of two diametrically, oppositely acting suspension devices. Each one of these devices includes an anchor arm 2, being suspended from anchor points, e.g., on wall 3 of a building, or a frame, or the like; the criterion being that the anchor point is a rigid one. The lower point of each anchor arm 2 is a connect point which is to remain invariant, at least in respect to any tendency of the tube to be displaced vertically.

Figure 1:
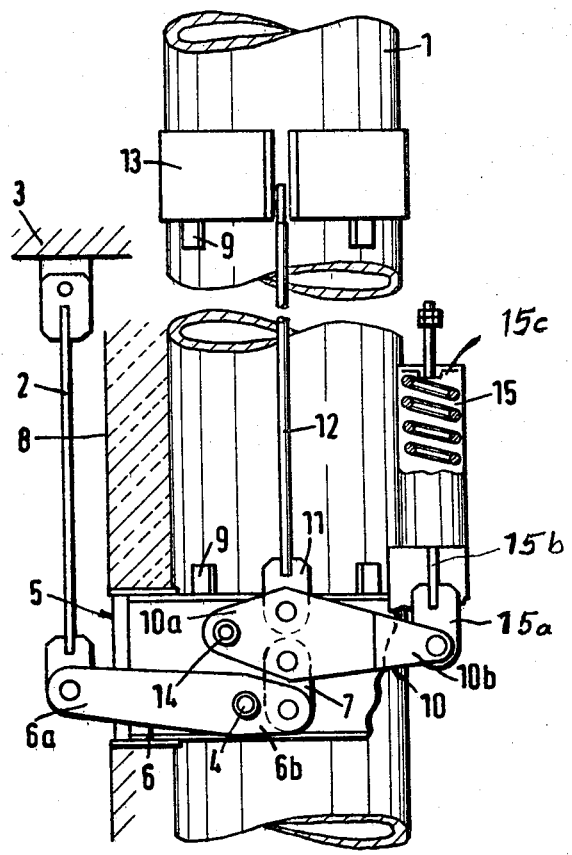
FIG. 1 is a side elevation of a suspension device of the preferred embodiment of the invention for practicing the best mode of the invention for the purpose of suspending a vertically running tube.

The suspension devices include each a two-arm lever 6, having a long arm 6a, a short arm 6b, and a pivot 4. The long arm 6a is pivotally linked to the lower end (connect point, supra) of anchor arm 2. The short arm 6b is pivotally linked to one end of a short and flat bar 7. Pivot 4 connects lever 6 to an annulus 5, being of welded construction, sitting on the tube, and being secured against axial and rotational displacement by means of lugs 9 which are welded to tube 1.

The other end of bar or connecting piece 7 is pivotally linked to a one-arm lever 10, having short-arm portion 10a pivotally linked to annulus 5 by means of pivot 14. The connecting point and pivot, as between bar or piece 7 and lever arm 10, is laterally offset from the predominant extension of arm 10, extending from pivot 14. Analogously laterally displaced, but opposite the displacement of the connection between elements 7 and 10, a connecting piece 11 is pivoted to arm 10. Piece 11 is a bearing and receiver for the lower end of a tension rod 12.

Rod 12 runs parallel to tube 1, and its upper end is held by a clamp 13 which is mounted to tube 1, and also by means of lugs 9 to prevent azimuthal as well as axial displacement. Rod 12, moreover, runs outside an insulation jacket 8, shown only in parts, but thermally insulating tube or pipe 1 from the environment.

It can readily be seen that, as far as pivot action is concerned, the short arm lever 6b acts upon and in line with rod 12, via a short-spaced connection across one-arm lever 10. In that sense, lever 10 serves only as a connect piece, as between lever 6 and rod 12. However, the long-arm portion 10b of lever 10 modifies the force transmission by means of spring bias.

The two rods 12 for the two suspension devices define a plane 16 which runs through the axis of the tube and, thus, locates the two rods in precisely diametrically opposed positions. Two springs 15 are analogously disposed in relation to each other, but each spring is located 45 degrees out of plane 16. Each of the springs 15 has one end (the lower one) connected to an eye 15a which, in turn, is pivoted to the respective long arm 10b. Springs 15 are each contained in a case, being affixed to tube 1, and the bottom of the spring bears against the bottom of that case. The connecting piece or eye 15a receives a rod 15b, holding a washer or disk 15c. Upon downward displacement of arm 10b (clockwise motion of lever 10), disk 15c compresses the spring. A subsequent counterclockwise rotation of lever 10 relieves the spring.

Figure 2:
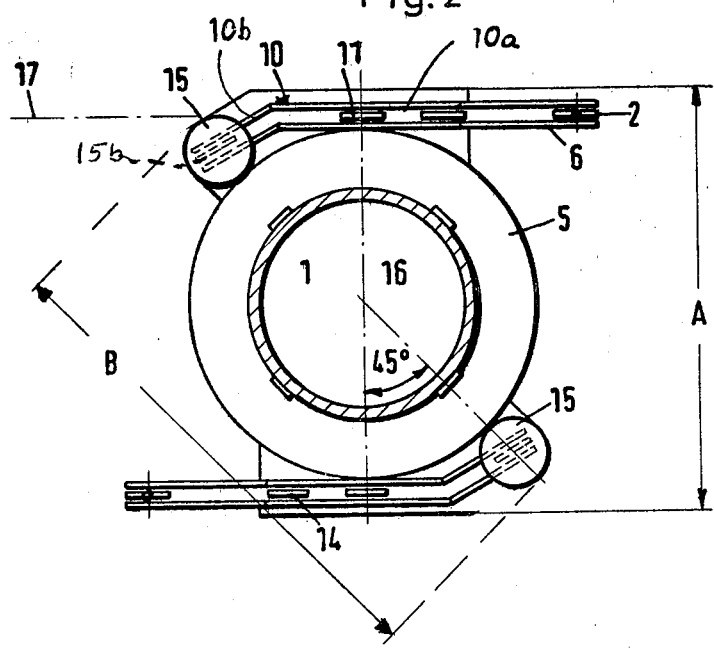
FIG. 2 is a top elevation section view of the device shown in FIG. 1, the section being taken through the tube as indicated by lines II—II in FIG. 1.

Each arm 10 is actually a double arm (see FIG. 2), and connections to connect pieces, to the rod, etc., are made in sandwich construction. The long arm portions 10b are, in each instance, angled off in order to bring the arm ends closer to the respective spring 15. The remainder of each arm 10 extends in a plane such as plane 17, being, e.g., the main mounting plane. It can readily be seen that the required space (A) for this suspension exceeds very little the outer diameter of the insulation jacket. Space (B) is just a little larger; but there is usually an adequate space available in a region being generally angularly offset from the main mounting plane, which is assumed to be plane 17.

The device (i.e., each of the twin suspension devices) includes two levers, 6 and 10 (each lever 10 consisting of two arms). The effect of these levers is as follows. The tube or pipe 1 is suspended by two of the devices, each acting in the following manner. Any weight force exerts a torque, tending to move lever 6 clockwise. This torque is offset by rod 12, as suspending the short lever arm 6b via lever 10. The resulting force is, in parts, taken up by the long arm 10b, compressing the spring. This spring compression relieves rod 12. In particular, spring 15 acts upon the long arm 10b. Due to a 1:3 divider ratio of arm portions 10a and 10b, the spring force is increased threefold in the line of action 7-11-12. Moreover, the divider ratio of the two arms 6a and 6b is about 4:1. Consequently, the force exerted upon spring 15 by operation of the suspension is just a little more (4:3) than the force taken up by anchor 2. This holds true only if a zero force acts upon rod 12 (e.g., if rod 12 were omitted). Furthermore, in the presence of rod 12, zero tension on the rod would be true only if the force acting upon the spring in that manner would not require a displacement (compression) of the spring which, of course, is not the case. Rather, spring 15 is not excessively strong and will undergo displacement and length variations under suspension load. Consequently, a tension force acts upon rod 12 to the extent that lever 10 is actually pivoted under the suspension force. That tension force, in turn, relieves spring 15. The load on the spring is, thus, about equal to, or even smaller than, the suspension load, and that, in turn, means that the spring can be made relatively small in size.

The aforementioned conditions exist and are established for a cold tube or pipe. Now, it may be assumed that the tube or pipe 1 is heated, but rod 12 is thermally insulated from the tube; in that case, the rod retains more or less its temperature, which is the temperature of the environment. (Some residual heating can be neglected.) It is further assumed that the tube or pipe 1 as a whole is displaced in an upward direction. For the purpose of analysis, it is, however, convenient to use, at first, the level of clamp 13 as a reference. Due to heating, the pipe or tube will expand, which means that annulus 5 is displaced downward (enlargement of the distance between parts 3 and 5 on the tube) in relation to clamp 13. Thus, pivot points 4 and 14 of levers 6 and 10 are displaced also downward. As far as lever 10 is concerned, it is being caused to pivot counterclockwise becasue rod 12 does not undergo the same dilation as the tube between elements 13 and 5. As a consequence, spring 15 is relieved to some extent, and rod 12 receives an additional load.

On the other hand, a counterclockwise motion of lever 10 is transmitted as a counterclockwise motion upon lever 6. The two pivots 4 and 14 are not subject to an axial displacement from each other. The connect point between anchors 2 and 6a is to remain invariant. Thus, the tube or pipe as a whole must be displaced in an upward direction, which is assumed to be the case. That upward motion is equal to the dilation modified by the divider ratio of lever 6.

It should be noted that the downward displacement of pivot 14 per se does not produce any pivot motion of lever 10 since spring 15 is likewise fixed to annulus 5 and moves downward therewith. But the linkage of arm 6b to lever 10 via bar 7 does result in pivot motions of levers 6 and 10 in the same direction, and spring 15 is relieved, to the extent of the divider ratio of arms 10 and 10b. As stated, rod 12 is to be loaded a little more. In any event, the load of suspension on the building or frame at anchoring area 3 remains the same.

Turning now to FIGS. 3 and 4, the parts affixed to lever 10 are quite similar to those affixed to lever 10 of like designation of FIG. 1, except that lever 10 is pivotally connected to an extension 5' of annulus 5. The latter, in particular, is connected to tube 1 (but not to extension 5'), although at a location which, as far as a projection in the vertical plane is concerned, is in line with suspension anchor 2'. This anchor now is connected to the long arm of an angle lever 18, whose short arm is pivotally linked to the short, flat bar 7. In this example, the springs are also azimuthally offset, but in opposite direction on opposite sides of the tube (see FIG. 4).

In operation, it is assumed that heating of the pipe line causes this particular horizontal portion to be lifted. Accordingly, lever 18 pivots counterclockwise. Distinct therefrom is the thermal tube expansion itself by tending to horizontally spread elements 14 and 5 apart, thereby causing lever 10 to pivot counterclockwise. Relief of spring 15 is the result of this expansion, just as before. The connecting piece 7 links levers 18 and 10; and they are both pivoted counterclockwise when the heated tube expands and is lifted. Consequently, the suspension and support force on anchor 2' and point 3 does not change.

The orientation of parts, and the configuration of some of them, differs in FIGS. 5 and 6, illustrating the situation for a horizontally running tube portion, but is expected to be lowered on heating of the pipe line. Extension 5' of annulus 5 is similar to the embodiment of FIGS. 3 and 4. The same is true as far as lever 18 and connecting piece 7 are concerned; but lever 10 has been replaced by a lever 19 since rod 12 is, in this instance, connected to the same side as is piece 7. The reason for this is that rod 12 should always be subjected to tension. Under cold conditions, the mere suspension of the pipe acts as a counterclockwise torque on lever 18, and counterclockwise torque on lever 19. Spring 20 is thus compressed. Spring 20 is now biased by way of initial adjustment, so that lever 19 actually exerts a slight tension on rod 12.

Lever arm 18 pivots counterclockwise when pipe 1 drops upon heating. Moreover, horizontal length expansion of the tube causes lever 19 to be pivoted counterclockwise, increasing compression of spring 20. As a consequence of the adjustment, a reduced residual tension is still exerted upon rod 12. Tube 1 is, thus, lowered without changing the suspension force because the connect point between the long arm of lever 18 and anchor 2 remains invariant.

The invention is not limited to the embodiments described above; but all changes and modifications thereof, not constituting departures from the spirit and scope of the invention, are intended to be included.

We claim:

1. A device for suspending a pipe or tube which undergoes thermal expansion as well as displacement under thermal load conditions, under conditions of providing an invariant suspension force in spite of such displacement, comprising in combination:
    a first lever having a long arm and a short arm anchor means having an anchor point and a pivot point on the pipe or tube, the long arm being suspended from said anchor point at a connect point, and at least the short arm extending transversely to the axis of the tube or pipe;
    a second lever having a pivot point connected to the pipe and having a point at a relatively short distance from the pivot point linked to a connecting piece, the connecting piece being further linked to the short arm of the first lever, to extend at substantially right angles from the extension of the second lever;
    a load relief spring interposed between a point on the tube or pipe, and the second lever at a point thereof being farther from the pivot point of the second lever than said point of relatively short distance; and
    a rod extending alongside said pipe or tube and having one end pivoted to the second lever at a point in line with the short distance point and at right angles to said extension of the second lever, an opposite end of the rod being secured to the pipe or tube so that, upon thermal expansion of the tube, said short distance point of the second lever is pivoted to the same extent it is pivoted as a result of pivoting of the first lever due to a displacement of the pipe or tube under conditions leaving the position of said connect point invariant.

2. In a device for suspending and supporting a pipe or tube which may expand and be vertically displaced upon being heated, the device including an anchor means connected to a frame, wall, or the like, at an anchor point and defining a connect point, generally aligned vertically with the anchor point, and at least vertically invariant in relation to the anchor point, the device further including a first lever having (i) a long arm pivoted to the connect point, (ii) a pivot point connected to the pipe or tube, and (iii) a short arm extending from the pivot point transverse to the axis of the tube or pipe, the device further including a rod connected with one end to the pipe or tube at a point remote from said pivot point, and extending alongside said pipe or tube, but in thermal insulative relation thereto, the improvement comprising:
    a second lever pivoted on the pipe or tube and having a first, short-arm connect portion linked to an opposite end of the rod and to the short arm of the first lever, the second lever extending generally transverse to the axis of the tube or pipe; and
    spring means disposed for acting as between the pipe and a second, long arm portion of the second lever, said spring being normally compressed, the compression changing to some extent whenever the pipe or tube expands thermally and, thereby, extends axial spacing between said pivot point and the point of connection of the one end of the rod to the pipe or tube.

3. A device as in claim 1 or 2, said long arm of the second lever having at least a portion bent towards the pipe or tube.

4. A device as in claim 3, said spring being azimuthally offset from the pivot point by about 45 degrees.

* * * * *